United States Patent
Laughlin et al.

(10) Patent No.: US 10,834,731 B1
(45) Date of Patent: Nov. 10, 2020

(54) CROWD SOURCED RESOURCE MANAGEMENT SYSTEM

(71) Applicant: The Boeing Company, Chicago, IL (US)

(72) Inventors: Brian Dale Laughlin, Wichita, KS (US); William David Kelsey, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/508,401

(22) Filed: Jul. 11, 2019

(51) Int. Cl.
| | |
|---|---|
| *H04N 7/18* | (2006.01) |
| *H04W 72/04* | (2009.01) |
| *H04W 84/18* | (2009.01) |
| *H04W 4/021* | (2018.01) |
| *H04W 64/00* | (2009.01) |
| *G06F 17/18* | (2006.01) |
| *G06N 20/00* | (2019.01) |

(52) U.S. Cl.
CPC ....... *H04W 72/0486* (2013.01); *H04W 4/021* (2013.01); *H04W 64/006* (2013.01); *H04W 72/048* (2013.01); *H04W 84/18* (2013.01); *G06F 17/18* (2013.01); *G06N 20/00* (2019.01)

(58) Field of Classification Search
CPC ..... H04L 41/12; H04L 41/5009; H04L 43/08; H04L 43/0817; H04L 45/02; H04L 45/302; H04W 28/0268
USPC .................. 455/41.2, 456.3, 404.1; 370/254; 705/26.8; 709/206; 340/990
See application file for complete search history.

(56) References Cited

U.S. PATENT DOCUMENTS

| | | | | |
|---|---|---|---|---|
| 7,489,993 | B2 * | 2/2009 | Coffee | B28C 5/422 180/209 |
| 8,108,914 | B2 * | 1/2012 | Hernoud | G07C 9/257 726/5 |
| 8,149,113 | B2 * | 4/2012 | Diem | H04W 84/12 340/539.13 |
| 9,871,874 | B2 * | 1/2018 | Diem | G06K 7/10366 |
| 2008/0098068 | A1 * | 4/2008 | Ebata | H04L 41/06 709/206 |
| 2010/0033575 | A1 * | 2/2010 | Lee | G08B 13/19656 348/159 |
| 2010/0305806 | A1 * | 12/2010 | Hawley | H04L 67/26 701/31.4 |

(Continued)

OTHER PUBLICATIONS

Yu et al., "Smartphone App Usage Prediction Using Points of Interest," Proceedings of the ACM on Interactive, Mobile, Wearable and Ubiquitous Technologies, vol. 1, No. 4, Article 174, Dec. 2017, 21 pages.

(Continued)

*Primary Examiner* — Tan H Trinh
(74) *Attorney, Agent, or Firm* — Yee & Associates, P.C.

(57) ABSTRACT

A method, apparatus, and system for managing events. A method receives mobile sensor information from mobile devices operated by human nodes in a location and determines whether the event has occurred at the location in which event management is needed for the event using the mobile sensor information. The method identifies resources needed for the event using the mobile sensor information in response to a determination that the event has occurred and allocates the resources identified to handle the event using the mobile sensor information.

36 Claims, 8 Drawing Sheets

(56) References Cited

U.S. PATENT DOCUMENTS

| | | | | |
|---|---|---|---|---|
| 2011/0215735 | A1* | 9/2011 | Herbst | H05B 47/19 |
| | | | | 315/297 |
| 2012/0135757 | A1* | 5/2012 | Lee | G01D 21/00 |
| | | | | 455/456.3 |
| 2013/0027227 | A1* | 1/2013 | Nordstrom | G08G 1/202 |
| | | | | 340/990 |
| 2014/0304109 | A1* | 10/2014 | von Neuforn | G06Q 30/0633 |
| | | | | 705/26.8 |
| 2015/0111517 | A1* | 4/2015 | Kowalewski | H04M 11/04 |
| | | | | 455/404.1 |
| 2016/0072891 | A1* | 3/2016 | Joshi | G06Q 30/0269 |
| | | | | 370/254 |
| 2017/0171359 | A1* | 6/2017 | Ando | H04Q 9/00 |
| 2018/0072397 | A1* | 3/2018 | Alexander | B64C 27/04 |
| 2018/0163985 | A1* | 6/2018 | Shelnutt | H04L 43/0817 |
| 2018/0219753 | A1* | 8/2018 | Arsenie | H04L 45/02 |
| 2018/0332434 | A1* | 11/2018 | Kulkarni | H04L 67/22 |
| 2018/0365607 | A1* | 12/2018 | Manouchehri | G06Q 10/0631 |
| 2019/0068434 | A1* | 2/2019 | Moreira da Mota | |
| | | | | H04L 41/0806 |
| 2019/0074090 | A1* | 3/2019 | Ronen | A61B 5/7275 |
| 2019/0357066 | A1* | 11/2019 | Kim | H04W 36/0088 |
| 2019/0362216 | A1* | 11/2019 | Stokes | G06F 3/016 |

OTHER PUBLICATIONS

Singh, "MIT's new invention can automatically detect gunshots, gunmen and witnesses as well," accessed May 29, 2019, 5 pages. http://www.whatafuture.com/mit-detect-gunshot-tracking-smartphones/.

* cited by examiner

CROWD SOURCED RESOURCE MANAGEMENT SYSTEM

BACKGROUND INFORMATION

1. Field

The present disclosure relates generally to an improved computer system and in particular, to a method, apparatus, and system for managing resources using crowd sourced information.

2. Background

Events are occurrences or things that happen in an environment. Resources can be allocated to manage an event once the event has been detected. In some cases, a quick response to an event may be desired to properly handle the event. Providing resources to manage an event as quickly as desired can be challenging.

For example, detecting the occurrence of an event that needs an allocation of resources can be more difficult and take more time than desired using current monitoring systems. These monitoring systems utilize cameras in fixed locations. The information provided by these monitoring systems can be difficult to analyze or incomplete.

For example, with current monitoring systems, cameras in fixed locations provide information such as video from a fixed perspective. As a result, information, such as video and images received from the cameras, are often not useful because the cameras are not pointed in a direction such that the event can be seen in video and images. For example, cameras may not generate video or images for events such as a person committing theft at a concert or a person using an unauthorized entrance at the concert. The cameras also may not detect a group of people acting untoward or in an unacceptable manner at the concert.

Currently, an individual can call in to report an event. The individual can relate information about the event, and resources can be allocated if needed to handle the event in a desired manner. The information with this type of reporting, however, can be incomplete and may not provide a complete picture of the situation.

Therefore, it would be desirable to have a method and apparatus that take into account at least some of the issues discussed above, as well as other possible issues. For example, it would be desirable to have a method and apparatus that overcome a technical problem with detecting events that require resource allocation.

SUMMARY

An embodiment of the present disclosure provides an event management system comprising an event controller in a computer system. The event controller receives mobile sensor information from mobile devices operated by human nodes in a location and determines whether an event has occurred at the location in which event management is needed for the event using the mobile sensor information. The event controller identifies resources needed for the event using the mobile sensor information in response to a determination that the event management is needed for the event and allocates the resources identified to handle the event.

Another embodiment of the present disclosure provides an event management system comprising sensor applications and an event controller in a computer system. The sensor applications run on mobile devices operated by human nodes. The sensor applications detect mobile sensor information generated by the mobile devices and transmit the mobile sensor information over wireless connections. The event controller is in communication with the sensor applications using the wireless connections and receives the mobile sensor information from the mobile devices operated by the human nodes in a location. The event controller determines whether an event has occurred at the location in which event management is needed for the event using the mobile sensor information. The event controller identifies resources needed for the event using the mobile sensor information in response to a determination that the event management is needed for the event and allocates the resources identified to handle the event.

Still another embodiment of the present disclosure provides a method for managing an event. The method receives mobile sensor information from mobile devices operated by human nodes in a location and determines whether the event has occurred at the location in which event management is needed for the event using the mobile sensor information. The method identifies resources needed for the event using the mobile sensor information in response to a determination that the event has occurred and allocates the resources identified to handle the event using the mobile sensor information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that quickly allocating resources to handle an event is desirable. The illustrative embodiments recognize and take into account that the current techniques for obtaining information about the event may not be timely or sufficiently complete to enable detecting an event that requires management or handling.

The illustrative embodiments recognize and take into account that people can better determine what is important in an environment as compared to using cameras in fixed locations or unmanned aerial vehicles. The illustrative embodiments recognize and take into account that people present at events often have mobile devices such as mobile phones, cameras, tablets, smart watches, or other devices that contain sensors capable of collecting information around the people and communicating the information over a network. Further, the illustrative embodiments recognize and take into account that people often point their mobile devices at areas of interest when an event occurs. As a result, the illustrative embodiments recognize and take into account that information generated by mobile devices are more likely to capture an event of interest.

Thus, illustrative embodiments provide a method, apparatus, and system for managing events. In one illustrative example, an event controller in a computer system receives mobile sensor information from mobile devices operated by human nodes in a location. The event controller determines whether an event has occurred at the location using the mobile sensor information and determines characteristics of the event using the mobile sensor information in response to a determination that the event has occurred. The event controller allocates resources to handle the event based on the characteristics of the event.

In one illustrative example, the mobile sensor information from mobile devices operated by people is considered crowdsourced data. The event controller can leverage the fact that the people holding these devices are likely to point them and generate mobile sensor information such as video, images, and audio about an event. This mobile sensor information can be used in place of or in addition to the information generated by currently available sensor systems such as fixed cameras, motion detectors, and other devices.

Figure 1:
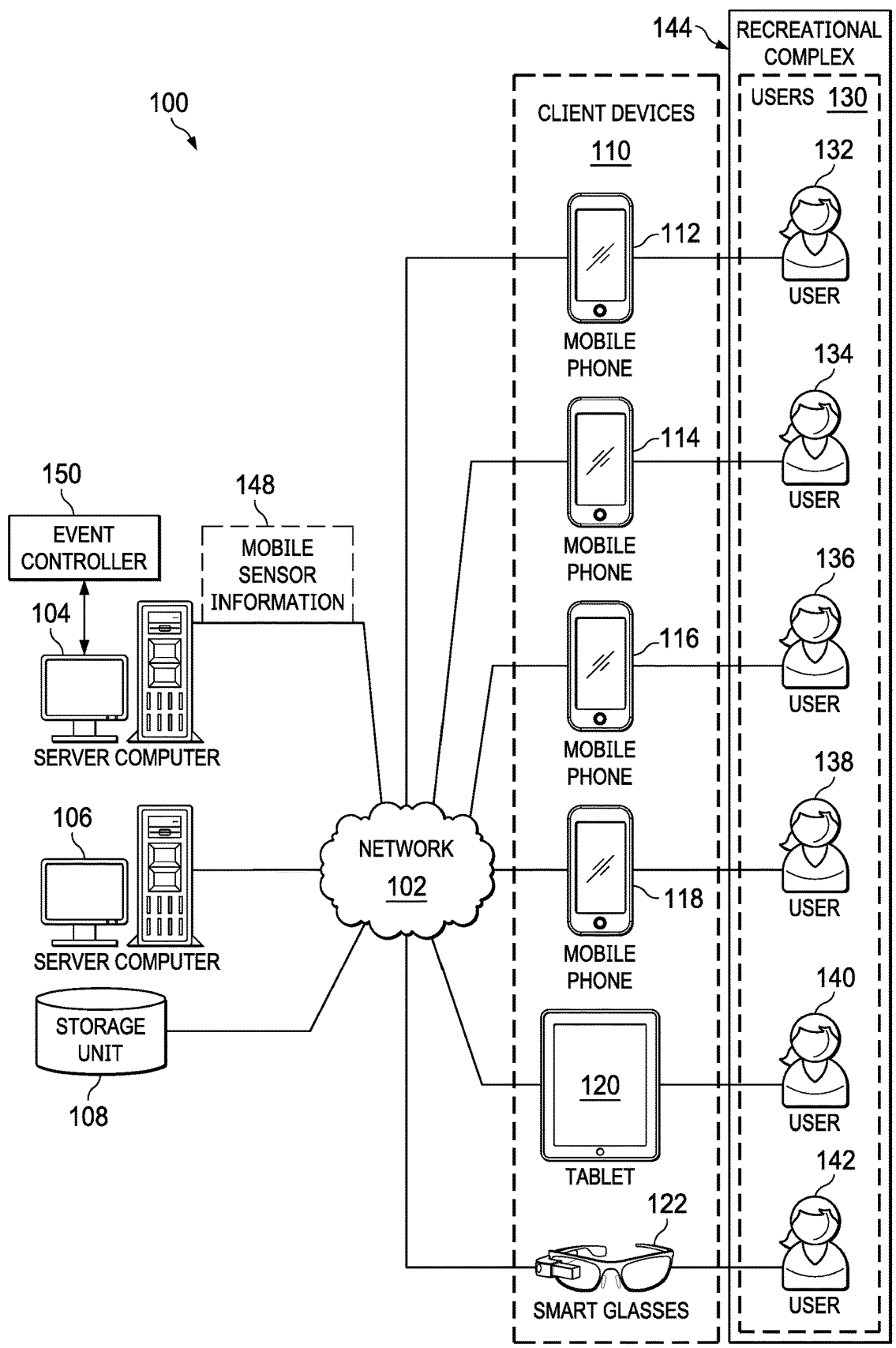
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include mobile phone 112, mobile phone 114, mobile phone 116, mobile phone 118, tablet computer 120, and smart glasses 122.

Some or all of client devices 110 may form an Internet of things (IoT) in which these physical devices can connect to network 102 and exchange information with each other over network 102 in addition to or in place of server computer 104 and server computer 106. In other illustrative examples, some or all of client devices 110 may form an ad hoc network in network 102.

In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110. For example, program code may be an application, also referred to as an "app" that is downloaded from an App Store as is known in the art.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, users 130 carry and operate client devices 110. When carrying a client device, a user can also be referred to as a human node. In this illustrative example, user 132 carries mobile phone 112; user 134 carries mobile phone 114; user 136 carries mobile phone 116; and user 138 carries mobile phone 118. Further, user 140 carries tablet computer 120 and user 142 carries smart glasses 122.

In this illustrative example, users 130 are located in recreational complex 144. Recreational complex 144 is a physical geographic location. In this illustrative example, users 130 are attending a fair held at recreational complex 144. Although recreational complex 144 is shown in the illustrated example, other physical geographic locations are contemplated.

Client devices 110 can generate mobile sensor information 148 when located in recreational complex 144. Mobile sensor information 148 can include, for example, images and video taken by users 130. Client devices 110 can send mobile sensor information 148 over network 102 to event controller 150 running on server computer 104.

Event controller 150 analyzes mobile sensor information 148 and determines whether an event is occurring in recreational complex 144. In this illustrative example, recreational complex 144 is the location of an event in the form of a music concert.

As depicted, the event controller 150 analyzes mobile sensor information 148. For example, a video in mobile sensor information 148 can be analyzed using various object recognition, computer vision, threat analysis, emergency situation analysis, human motion analysis, and other techniques.

For example, an analysis of the video in mobile sensor information 148 by event controller 150 can indicate that the events occurring at the concert are normal in recreational complex 144. In another example, analysis of the video in mobile sensor information 148 can indicate that an undesired event such as an automobile accident, an unruly crowd, a person with heat stroke or some other event is occurring in recreational complex 144 for which management is required.

When event controller 150 detects an event in which assistance is needed from analyzing mobile sensor information 148, event controller 150 can allocate resources to manage the event. For example, the event controller 150 can direct police and paramedics to the location of an automobile accident within recreational complex 144. As another example, event controller 150 can direct police and security to help manage an unruly crowd and several paramedics to aid the person identified as having heat stroke.

Further, event controller 150 can also utilize users 130 as resources. For example, event controller 150 can request or direct some portion of users 132 to point client devices 110 in a particular direction to generate additional personal sensor data about an event that may have just started or is emerging.

In yet another illustrative example, event controller 150 can also request assistance from users 130. For example, event controller 150 can request assistance from a doctor in users 130. Event controller 150 can make a general request for an identification of users 130 who are doctors.

Figure 2:
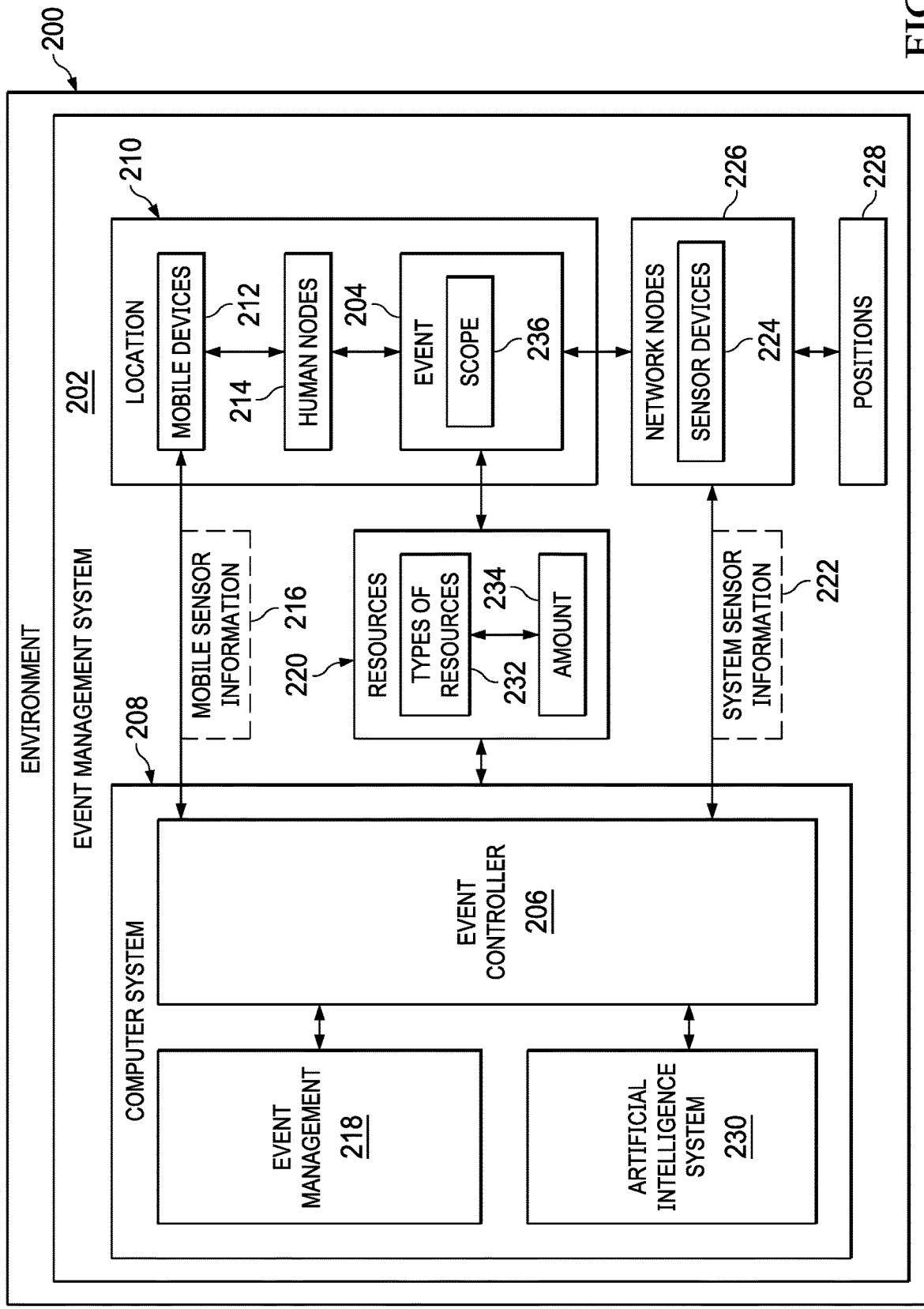
FIG. 2 is an illustration of a block diagram of an event management environment in accordance with an illustrative embodiment.

With reference now to FIG. 2, an illustration of a block diagram of an event management environment is depicted in accordance with an illustrative embodiment. In this illustrative example, event management environment 200 includes components that can be implemented in hardware such as the hardware shown in network data processing system 100 in FIG. 1.

In this illustrative example, event management system 202 in event management environment 200 operates to manage event 204. In this illustrative example, event management system 202 comprises event controller 206 running on computer system 208.

As depicted, event controller 206 can be implemented in software, hardware, firmware or a combination thereof. When software is used, the operations performed by event controller 206 can be implemented in program code configured to run on hardware, such as a processor unit. When firmware is used, the operations performed by event controller 206 can be implemented in program code and data and stored in persistent memory to run on a processor unit. When hardware is employed, the hardware can include circuits that operate to perform the operations in event controller 206.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

As depicted, event controller 206 can leverage crowd sourced information in mobile sensor information 216 generated about location 210 to determine whether event 204 has occurred in location 210. In this illustrative example, mobile devices 212 operated by human nodes 214 in location 210 can generate mobile sensor information 216.

In this illustrative example, location 210 can take a number of different forms. For example, location 210 can be one of a park, a field, a city park, a theme park, a concert hall, a convention center, a recreational complex, a stage, a road intersection, a parking lot, a room, a lake, and a pool. Location 210 can also be an arbitrary area. For example, location 210 can be defined as the area in a square that is 100 yards by 100 yards. In another example, location 210 can be a rectangle, a hexagon, an irregular shape, or some other suitable shape.

Mobile devices 212 can take a number of different forms. For example, mobile devices 212 can include at least one of a mobile phone, a tablet computer, smart glasses, a smartwatch, a wearable device, a handheld computer, a laptop computer, a personal digital assistant, a digital camera, or other suitable types of devices that include a processor and one or more sensors that can detect the environment in location 210 and generate mobile sensor information 216 about the environment.

In this illustrative example, mobile sensor information 216 can include one or more forms of information. Mobile sensor information 216 can include data generated by sensors that detect the environment around mobile devices 212. For example, sensors can detect light, movement, temperature, or other environmental parameters in the environment to generate mobile sensor information 216. Further, mobile sensor information 216 can include data generated by sensors that receive user input generated by human nodes 214. In other words, human nodes 214 can enter text on a touch screen, speak into a microphone, or make gestures that are detected by a camera to form mobile sensor information 216.

Mobile sensor information 216 can include, for example, at least one of an image, a video, an audio, a position, a speed, a velocity, an acceleration, a temperature, a heart rate, an email message, a text message, a social network posting, an alert, or other types of information that can be used by event controller 206 in determining whether event 204 is present and analyzing event 204 when event 204 is present.

In this illustrative example, position is a position of the mobile device carried by the person. The position can be described in three-dimensional coordinates such as latitude, longitude, and altitude. Further, the position also describes an orientation of the mobile device. This position can be used to identify a feature of interest by collecting the positions of the mobile devices. The position of a mobile device can also be used to determine the viewpoint of images generated by the mobile device. These positions and the viewpoints can be used to stitch or combine images to form a larger picture or video of an area such as where event 204 is taking place.

As depicted, event controller 206 in computer system 208 receives mobile sensor information 216 from mobile devices 212 operated by human nodes 214 in location 210. Event controller 206 can determine whether event 204 has occurred at location 210 in which event management 218 is needed for event 204 using mobile sensor information 216.

Event management 218 is a process or operation in which people, objects, or other things related to or are part of an event are handled, controlled, or dealt with in a manner that controls the event in a desired manner. For example, event management 218 may comprise extinguishing a fire. In another example, event management 218 may include directing people to a safety zone or area. In yet another example, event management 218 may comprise locating and apprehending a number of suspects for questioning.

Event 204 can take a number of different forms. For example, event 204 can be one of a sports event, an indoor event, an outdoor event, a concert, a play, a carnival, an accident, a fire, a crime scene, and other suitable types of events. Event 204 may or may not need event management depending on the analysis of mobile sensor information 216 performed by event controller 206.

Event controller 206 can identify resources 220 needed for event 204 using mobile sensor information 216 in response to when the event management 218 is needed for event 204. Resources 220 are identified as resources needed to manage event 204 in a desired manner.

Event controller 206 can allocate the resources 220 identified to handle event 204.

In addition to receiving mobile sensor information 216 from mobile devices 212 carried by human nodes 214, event controller 206 can also receive system sensor information 222 from sensor devices 224 in network nodes 226 in event management system 202. In this illustrative example, system sensor information 222 can supplement or augment mobile sensor information 216. As depicted, mobile sensor information 216 includes crowdsourced data in which data is received from people, such as human nodes 214, to build a collection of data for use in obtaining sufficient information to determine whether event 204 as occurred. When event 204 has occurred, mobile sensor information 216 be used to determine whether group whether event 204 requires event management 218.

In this illustrative example, sensor devices 224 in mobile devices 212 can include at least one of an image sensor, a charge coupled device (CCD) sensor, a complementary metal oxide semiconductor (CMOS) sensor, a microphone, an inductive loop detector, an ultrasonic sensor, a global positioning system receiver, an accelerometer, or other suitable sensors.

As depicted, network nodes 226 are physical devices that include the processing capability to generate system sensor information 222 based on signals received from sensor devices 224. Network nodes 226 can include at least one of a camera, an unmanned aerial vehicle, an unmanned ground vehicle, an emergency phone station, a traffic light, a body camera, or other suitable types of network nodes. In this illustrative example, network nodes 226 are capable of communicating wirelessly over a network to send system sensor information 222 to event controller 206.

With the availability of mobile sensor information 216, event controller 206 can increase the usability of system sensor information 222 received from sensor devices 224. For example, event controller 206 can direct or command network nodes 226 to generate system sensor information 222 for a set of positions 228 relative to location 210 of event 204 based on mobile sensor information 216. A position is where an object such as a network node is located. The position can be described using a two-dimensional or a three-dimensional coordinate system. For example, the position of a network node can be described using latitude and longitude. In some illustrative examples, altitude can also be used. In still other illustrative examples, a position can include the orientation of the network node. The set of positions 228 can include location 210 of event 204 in some illustrative examples.

For example, event controller 206 can identify the set of positions 228 in which sensor devices 224 in network nodes 226 are present and able to generate system sensor information 222 about event 204. For example. cameras that are sufficiently close can be used to generate images for system sensor information 222. With positionable cameras, event controller 206 can direct those cameras to point in the direction of event 204. System sensor information 222 from other network nodes in the network nodes 226 not in the set of positions 228 can be processed at lower priority as compared to system sensor information 222 from sensor devices 224 in network nodes 226 in the set of positions 228 in this illustrative example.

Further, event controller 206 can direct the collection of system sensor information 222 by sensor devices in network nodes 226 that are in set of positions 228 adjacent to or within some selected distance of location 210. This sensor system information can be used to determine the extent of event 204. Further, this generation of system sensor information 222 and the set of positions 228 can be used for at least one of detecting, tracking, or identifying individuals who may be associated with event 204 or of interest with respect to event 204.

As depicted, the analysis of at least one of mobile sensor information 216 or system sensor information 222 can be performed by event controller 206 using artificial intelligence system 230. Artificial intelligence system 230 is a system that has intelligent behavior and can be based on function of the human brain.

Artificial intelligence system 230 comprises at least one of an artificial neural network, cognitive system, a Bayesian network, fuzzy logic, an expert system, a natural language system, a cognitive system, or some other suitable system. Machine learning is used to train the artificial intelligence system. Machine learning involves inputting data to the process and allowing the process to adjust and improve the function of the artificial intelligence system.

A cognitive system is a computing system that mimics the function of a human brain. The cognitive system can be, for example, IBM Watson available from International Business Machines Corporation.

For example, in analyzing mobile sensor information 216 to determine whether event 204 has occurred at location 210 in which event management 218 is needed for event 204, event controller 206 can analyze mobile sensor information 216 to determine whether event 204 has occurred at location 210 in which event management 218 is needed for event 204 using artificial intelligence system 230. Artificial intelligence system 230 can implement at least one of object recognition, computer vision, video content analysis, feature detection, threat analysis, emergency situation analysis, human motion analysis, and other techniques.

For example, artificial intelligence system 230 can use video content analysis to automatically analyze mobile sensor information 216 to detect temporal and spatial events. This type of analysis can be used by other techniques to perform object identification, behavior analysis, or other types of situation awareness techniques.

Further, in determining whether event 204 has occurred at location 210 in which event management 218 is needed for event 204 using mobile sensor information 216, event controller 206 can determine a trend in a crowd behavior including determining a set of outliers in the crowd behavior. Outliers can be persons of interest with respect to event 204. This type of analysis can also be made using video content analysis as well as other techniques.

Further, artificial intelligence system 230 can be used in identifying resources 220 needed for event 204 using mobile sensor information 216. Resources 220 needed for event 204 are resources that can be used to manage event 204 in any desired manner. For example, artificial intelligence system 230 can determine a set of types of resources 220 and amount 234 for each of the set of types of resources 220 as part of allocating resources 220 for event 204.

The allocation of resources can take various forms. For example, in allocating resources 220 to manage event 204, event controller 206 can send a set of first responders to location 210 of event 204. First responders can be people designated or trained to respond to an emergency. The first responders can include police, security personnel, firemen, paramedics, and other people with skills that can be used in an emergency or other situation in which first responders are needed.

In another illustrative example, the allocating of resources 220 to manage event 204 by event controller 206 can include event controller 206 requesting assistance from a set of human nodes 214 having a set of skills needed to handle event 204. For example, the skills may include first-aid, emergency medical services, security, police enforcement, or other suitable skills.

In yet another illustrative example, event controller 206 can allocate resources 220 through requesting a set of human nodes 214 to direct sensors in a set of mobile devices 212 carried by the set of human nodes 214 in a selected direction. The selected direction can be in the direction of event 204, in locations near the location 210 of event 204, at people fleeing or leaving location 210, or other suitable directions.

In allocating resources, event controller 206 can send messages to the resources. These messages can be, for example, at least one of a text message, email message, a voice call, or other message to people who are resources 220. Message can also include a map with route or graphical indicators showing clear people who are resources 220 should be deployed. In another illustrative example, event controller 206 consent messages such as control signals or commands to unmanned aerial vehicles or unmanned ground vehicles.

For example, guidance can be provided on the screens of the set of mobile devices 212 when the set of human 218 curing the session mobile devices 212 are selected to be part of resources 220 that are allocated. This guidance can be text, arrows, or other graphical indicators that indicate the direction to point a camera in a mobile device. In another illustrative example, the guidance can be an audio or verbal guidance.

In the illustrative example, event controller 206 continues to receive mobile sensor information 216 after event 204 is detected and determines changes in scope 236 of event 204 using mobile sensor information 216 received after event 204 is detected.

In this illustrative example, scope 236 can take a number of different forms. Scope 236 can be the area that event 204 encompasses or the number of people involved in event 204. In another illustrative example, scope 236 can be the intensity or severity of event 204.

In determining changes in scope 236 of event 204 using mobile sensor information 216 received after event 204 is detected, event controller 206 can determine changes in scope 236 of event 204 using mobile sensor information 216 received after event 204 is detected using mobile sensor information 216 that indicates at least one of a movement, a dispersal, a growth, a direction of movement, or a speed of movement of a crowd of people.

In one illustrative example, one or more technical solutions are present that overcome a technical problem with detecting events and managing events that require resource allocation. As a result, one or more technical solutions can provide a technical effect improving at least one of speed and accuracy in detecting events that need to be handled using personal sensor data from human nodes. In this illustrative example, one or more technical solutions are present in which crowd sourced data from people using mobile devices is analyzed to determine whether event is present. Sensor devices 224 such as cameras are, in essence, sensors on demand.

As a result, event management system 202 operates as a crowd sourced resource management system in which events can be managed using crowd sourced information such as mobile sensor information 216. The management of events can occur through allocating resources 220, which can be human nodes 214 carrying mobile devices 212.

In this manner, one or more illustrative examples sensor devices 224, such as cameras in mobile devices 212 carried by human nodes 214, are focused on an event. This focus may take the form of generating images or recording video. Further, the mobile sensor information can also be used to detect when a person is acting contrary to other people in an area. The actions of this person are also considered an event. In this manner, a suspect can be identified. Further, when a person walks away from a location without recording video, the person also can be a suspect in some illustrative examples.

Computer system 208 can be configured to perform at least one of the steps, operations, or actions described in the different illustrative examples using software, hardware, firmware or a combination thereof. As a result, computer system 208 operates as a special purpose computer system in which computer system 208 enables detecting an event in which event management 218 is needed as compared to current techniques. In particular, event controller 206 transforms computer system 208 into a special purpose computer system as compared to currently available general computer systems that do not have event controller 206.

In the illustrative example, the use of event controller 206 in computer system 208 integrates processes into a practical application for a method managing an event that increases the performance of computer system 208. In other words, event controller 206 in computer system 208 is directed to a practical application of processes integrated into event controller 206 in computer system 208 that receives mobile sensor information 216 from mobile devices 212 operated by human nodes 214 and analyzes mobile sensor information 216 to determine whether event 204 has occurred in which event management 218 is needed. In this illustrative example, event controller in computer system 208 can identify resources needed for the event using the mobile sensor information and allocate the resources identified to handle the event.

Figure 3:
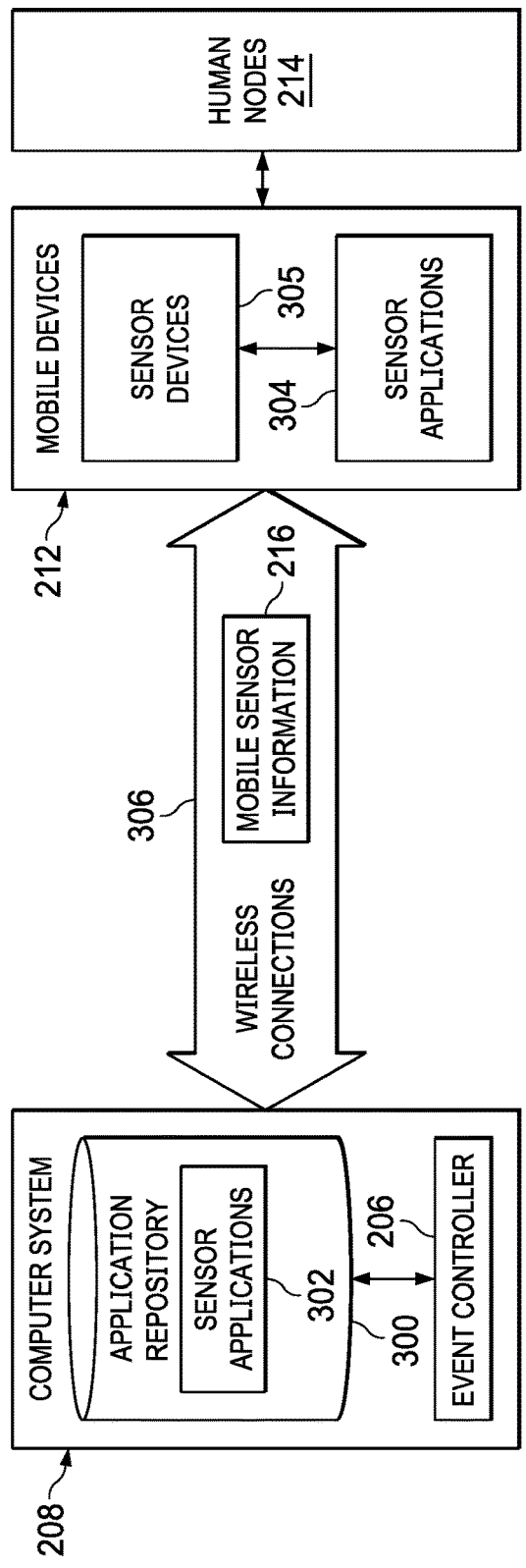
FIG. 3 is an illustration of a block diagram of a dataflow for sensor applications in mobile devices to collect and send mobile sensor information in accordance with an illustrative embodiment.

Turning next to FIG. 3, an illustration of a block diagram of a dataflow for sensor applications in mobile devices to collect and send mobile sensor information is depicted in accordance with an illustrative embodiment. In the illustrative examples, the same reference numeral may be used in more than one figure. This reuse of a reference numeral in different figures represents the same element in the different figures.

In this illustrative example, application repository 300 stores sensor applications 302 that can be downloaded to and run on mobile devices 212. Sensor applications 302 can be mobile apps that are designed to run on a mobile device such as a mobile phone, tablet computer, smart watch, smart glasses, or other type of mobile device. In other illustrative examples, sensor applications 302 can be plug-ins configured to run in a browser or other application configured to run on a mobile device.

In this illustrative example, sensor applications 304 have been downloaded from application repository 300 and installed on mobile devices 212. As depicted, sensor applications 304 identify mobile sensor information 216 generated by sensor devices 305 in mobile devices 212. Additionally, sensor applications 302 can send mobile sensor information 216 to event controller 206 over wireless connections 306 to computer system 208 in which event controller 206 is located.

Further, event controller 206 can request a set of human nodes 214 to direct sensors devices 305 in the set of mobile devices 212 carried by the set of the human nodes 214 a selected direction. In this illustrative example, sensor applications 304 can provide guidance to the set of human nodes 214. For example, sensor applications 304 can provide instructions. These instructions can be selected from at least one of text, audio, or a graphical indicator. For example, text or voice instructions can be sent saying "please take a picture of the blue automobile to your left". In another example, one or graphical indicators such as arrows can be used to indicate the direction in which a camera in mobile phone should be pointed.

Figure 4:
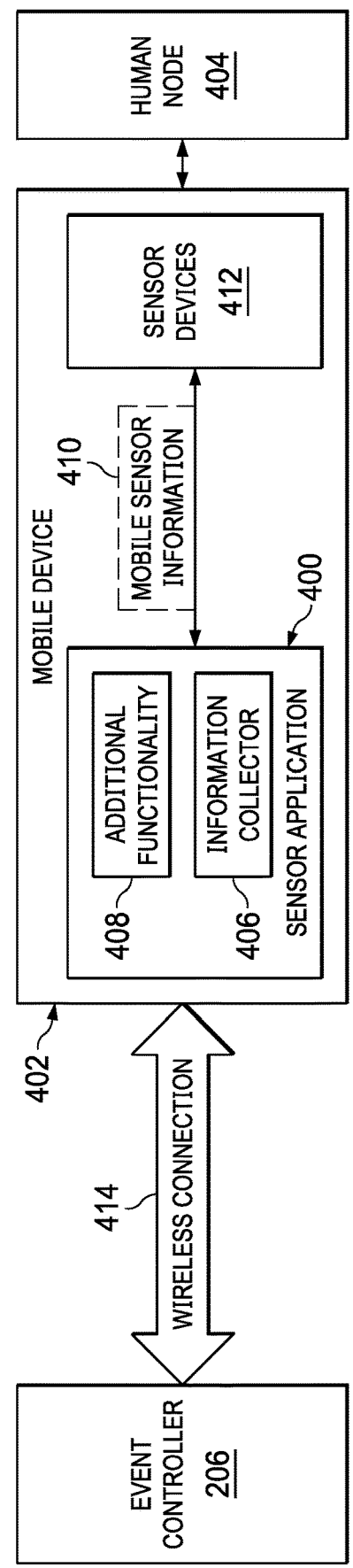
FIG. 4 is an illustration of a block diagram of a sensor application in a mobile device depicted in accordance with an illustrative embodiment

With reference to FIG. 4, an illustration of a block diagram of a sensor application in a mobile device is depicted in accordance with an illustrative embodiment. In this illustrative example, sensor application 400 in mobile device 402 is an example of a sensor application in sensor applications 302. Mobile device 402 is an example of a mobile device in mobile devices 212.

In this illustrative example, sensor application 400 includes information collector 406 and additional functionality 408. Information collector 406 collects mobile sensor information 410 generated by a set of sensor devices 412 in mobile device 402.

For example, information collector 406 in sensor application 400 can have access to a set of sensor devices 412. The set of sensor devices 412 can include at least one of a global positioning system receiver, a camera, a microphone, a touchscreen, an accelerometer, a gyroscope, or other components in mobile device 402. Information collector 406 can detect signals and data generated by the other devices in mobile device 402 and collect that information as mobile sensor information 410.

Information collector 406 also can transmit mobile sensor information 410 to event controller 206 over wireless connection 414. The transmission of mobile sensor information 410 can be performed periodically or non-periodically. For example, sensor application 304 can transmit mobile sensor information 410 every minute, 10 seconds, 30 seconds, or some other suitable period of time. In another example, sensor application 400 can transmit mobile sensor information 410 in response to a nonperiodic event such as the generation of images and camera the posting of a message on a social network, or some other suitable action. Further, event controller 206 can request the transmission of mobile sensor information 410.

Additional functionality 408 can be configured or customized for a particular location or type of activity. For example, additional functionality 408 can be customized to perform a number of different functions such as providing a schedule, a map, communications with a concierge, an ability to make reservations, or other suitable functionality.

For example, if human node 404 is at a concert, additional functionality 408 can provide a schedule of performance times. As another example, if human node 404 is at a fair, additional functionality 408 can provide a map of the fairgrounds.

The illustration of event management environment 200 in the different components illustrated in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, mobile devices 212 can be considered part of event management system 202 in some illustrative examples. In another illustrative example, event controller 206 can monitor one or more locations in addition to location 210. Other mobile devices can be present in which information collector 406 in sensor application 400 is not the enabled.

Figure 5:
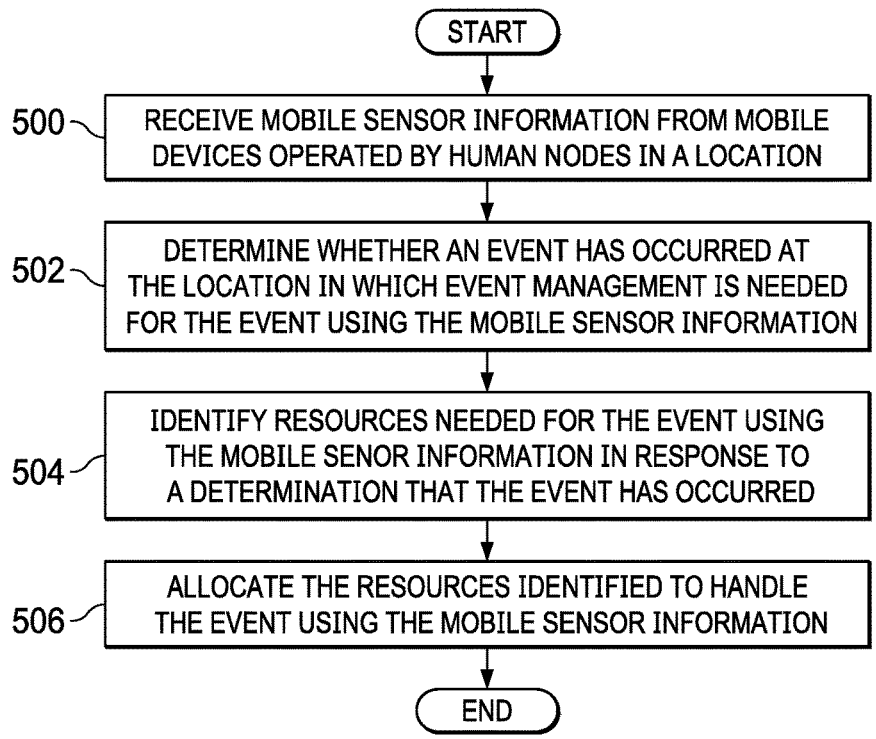
FIG. 5 is an illustration of a flowchart of a process for managing an event in accordance with an illustrative embodiment.

Turning next to FIG. 5, an illustration of a flowchart of a process for managing an event is depicted in accordance with an illustrative embodiment. The process in FIG. 5 can be implemented in hardware, software, or both. When implemented in software, the process can take the form of program code that is run by one or more processor units located in one or more hardware devices in one or more computer systems. For example, the process in FIG. 5 can be implemented in event controller 206 in computer system 208 in FIG. 2. In this illustrative example, one or more of the operations in the process can be implemented using artificial intelligence system 230 that is accessed by or integrated in event controller 206.

The process begins by receiving mobile sensor information from mobile devices operated by human nodes in a location (operation 500). Mobile sensor information is crowdsourced data in this depicted example in which this information is gathered from people who have mobile devices that are connected to a network such as at least one of the Internet or an ad hoc network.

The process determines whether an event has occurred at the location in which event management is needed for the event using the mobile sensor information (operation 502). The determination in operation 502 can be performed by using a model generated using the mobile sensor information.

The process identifies resources needed for the event using the mobile sensor information in response to a determination that the event has occurred (operation 504). The process allocates the resources identified to handle the event using the mobile sensor information (operation 506). The process terminates thereafter.

Figure 6:
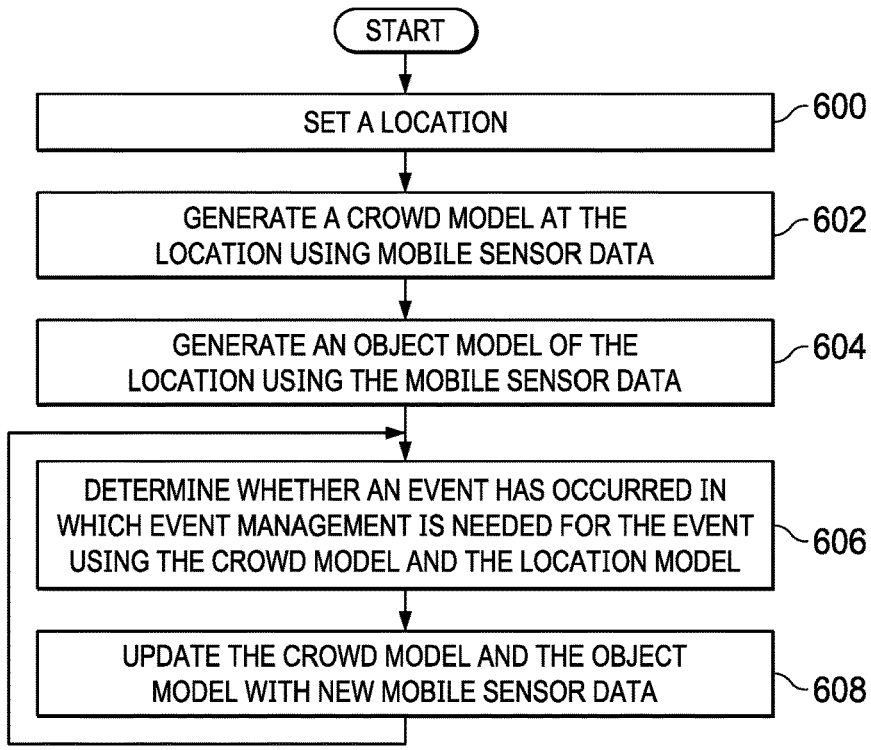
FIG. 6 is an illustration of a flowchart of a process for determining whether an event has occurred in accordance with an illustrative embodiment.

Turning to FIG. 6, illustration of a flowchart of a process for determining whether an event has occurred is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process in FIG. 6 can be implemented in event controller 206 in computer system 208 in FIG. 2. In this illustrative example, one or more of the operations in the process can be implemented using artificial intelligence system 230 that is accessed by or integrated in event controller 206. The process illustrated in FIG. 6 is an example of one manner in which operation 502 in FIG. 5 can be implemented.

The process begins by selecting a location (operation 600). The process generates a crowd model at the location using mobile sensor data (operation 602). The crowd model is a model of a crowd in which human nodes are present. This model can provide information about the location. For example, crowd model can be analyzed to determine crowd behavior.

In this illustrative example, crowd model can be generated using mobile sensor information from mobile devices carried by human nodes. For example, mobile sensor data from global positioning system receivers and accelerometers in the mobile devices carried by human nodes can be used to generate a crowd model. The crowd model identifies human nodes and can include an identification of other people. Video and image data can be used to identify other people and their movement.

As a result, the crowd model can be used to determine the location and actions of people in the crowd and the crowd as an entity in real-time. For example, at least one of growth, dispersal, movement, direction of movement, speed of movement, or other characteristics of the crowd can be determined using mobile sensor data from the mobile devices carried by human nodes in the crowd.

The process generates an object model of the location using the mobile sensor data (operation 604). Further, video and images can be stitched together to generate a three-dimensional view or model of the location in which the crowd is located. Image stitching processes combine multiple photographic images with overlapping fields of view to provide a wider field.

Further, in addition to the views provided by the image information, these combined images can be used to generated a three-dimensional model of objects in the images in the location. Images without overlap can also be viewed and used to generate a three-dimensional model of the objects. As a result, images and video of the objects can provide a more complete view of the location as compared to only viewing the images or video without any organization.

With different information sources, mobile sensor information such as video or images from mobile devices carried by human nodes can be selected or ranked based on which mobile devices have a clearer view of the location of an event. The selection and ranking of video images can also be based on how close mobile devices are to the events.

The process determines whether an event has occurred in which event management is needed for the event using the crowd model and the location model (operation 606). The analysis of this three-dimensional model can be performed to determine whether an event has occurred that requires event management. For example, a determination of whether event management is needed can be based on analyzing the crowd model and object model to determine whether an event is an undesired event. For example, an accident, an unruly crowd, gunfire, or other events can be undesired events that need event management. In another illustrative example, a desired event can also need event management. For example, a desired event can be a locating of a lost child.

In another example, with a gunshot, the behavior of people in the location using the crowd model and object model can be analyzed to identify one or more suspects for persons of interest based on the behavior of people that may be outliers or aberrant as compared to the majority of the crowd.

The process updates the crowd model and the object model with new mobile sensor data (operation 608). In this manner, the models can be updated dynamically and in real-time. The process then returns to operation 606. The process runs until information about the location is no longer needed.

The result of the determination can be used in operation 504 and operation 506 to identify and allocate resources to handle the event. Further, multiple threads can run using this process to make determinations about many locations in parallel.

Figure 7:
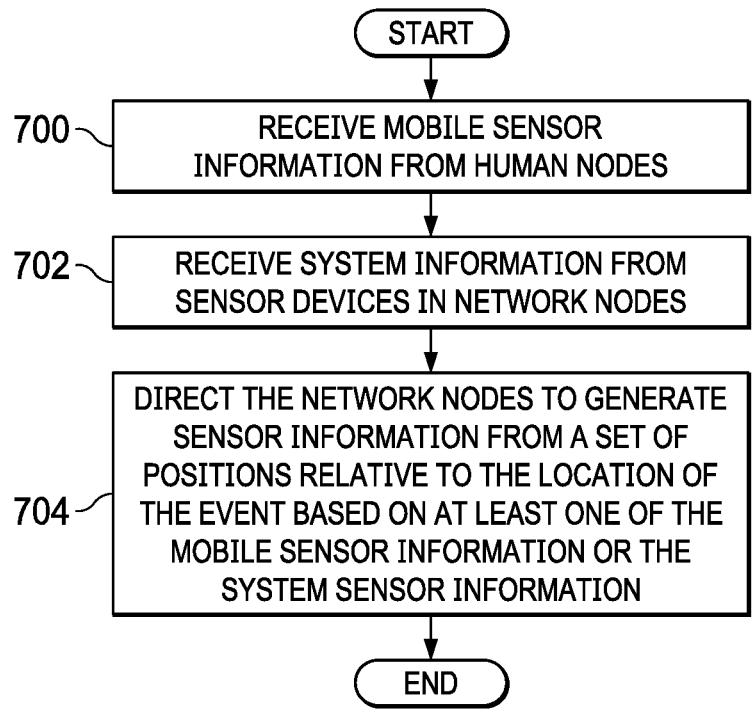
FIG. 7 is an illustration of a flowchart of a process for identifying resources in accordance with an illustrative embodiment.

Turning next to FIG. 7, an illustration of a flowchart of a process for collecting sensor information is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process in FIG. 7 can be implemented in event controller 206 in computer system 208 in FIG. 2. In this illustrative example, one or more of the operations in the process can be implemented using artificial intelligence system 230 that is accessed by or integrated in event controller 206.

The process begins by receiving mobile sensor information from human nodes (operation 700). In operation 700, the mobile sensor information is received from mobile devices carried by the human nodes. The process receives system information from sensor devices in network nodes (operation 702). The process directs the network nodes to generate sensor information from a set of positions relative to the location of the event based on at least one of the mobile sensor information or the system sensor information (operation 704). The process terminates thereafter.

Figure 8:
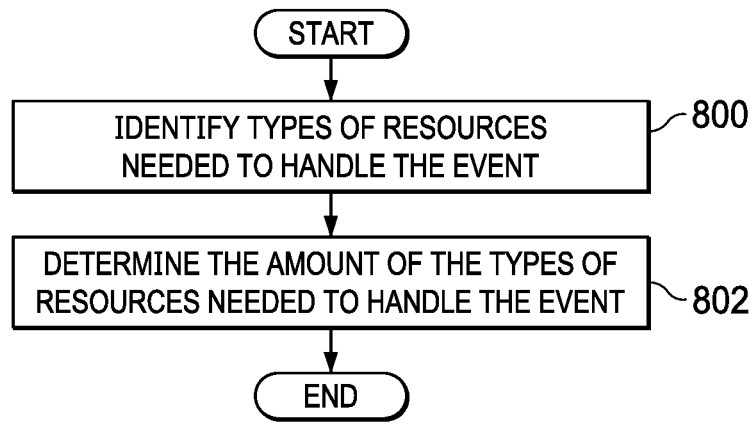
FIG. 8 is an illustration of a flowchart of a process for allocating resources in accordance with an illustrative embodiment.

Turning next to FIG. 8, an illustration of a flowchart of a process for identifying resources is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process in FIG. 8 can be implemented in event controller 206 in computer system 208 in FIG. 2. In this illustrative example, one or more of the operations in the process can be implemented using artificial intelligence system 230 that is accessed by or integrated in event controller 206. This process is an example of one manner in which operation 504 can be implemented.

The process begins by identifying types of resources needed to handle the event (operation 800). The types of resources can take a number of different forms. For example, the types of resources can be selected from at least one of medical, security, crowd control, monitoring, video capturing, or other suitable types of resources. In this illustrative example, a medical resource can include at least one of a paramedic, a nurse, a doctor, or some other suitable type of person. A security resource can include a security guard, a police officer, an undercover officer, a canine unit, an unmanned aerial vehicle (UAV), an unmanned ground vehicle (UAG), or other suitable types of security resources. In other words, resources can include people and equipment or physical devices.

The process determines the amount of the types of resources needed to handle the event (operation 802). The process terminates thereafter. In determining the amount of types of resources, a number of people is identified for each type of resource that is needed.

Figure 9:
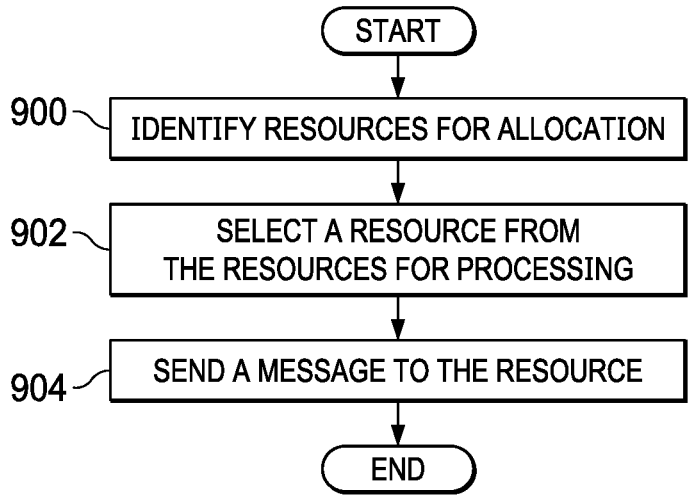
FIG. 9, is an illustration of a flowchart of a process for collecting sensor information in accordance with an illustrative embodiment.

Turning next to FIG. 9, an illustration of a flowchart of a process for allocating resources is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process in FIG. 9 can be implemented in event controller 206 in computer system 208 in FIG. 2. In this illustrative example, one or more of the operations in the process can be implemented using artificial intelligence system 230 that is accessed by or integrated in event controller 206. This process is an example of one manner in which operation 506 can be implemented.

The process begins by identifying resources for allocation (operation 900). The resources identified for allocation in operation 900 can be identified using the process in FIG. 8.

The process selects a resource from the resources for processing (operation 902). The resource can be one or more people. In another example, the resource can be a machine such as an unmanned ground vehicle (UMG) or an unmanned aerial vehicle (UAV).

The process sends a message to the resource (operation 904). The process terminates thereafter.

The message can include a number of different pieces of information used to perform real-world actions. These messages can be sent to from a computer or computer system to client devices such as mobile phones carried by people or to client devices, such as an unmanned aerial vehicle, that are resources. Messages can be sent using wireless communications over a network such as hypertext transfer protocol (HTTP) messages or other types of messages using suitable protocols.

For example, the message can include a piece of information that provides a location or area that the resources are to be located. The message can also include a piece of information that comprises an instruction for an action to be performed when the resource is in the location or area.

For example, the instruction can be to generate video of a location or area, generate video of a particular person area, or other suitable instructions. As another example, the instruction can be to help direct people to an exit, people to another location, or some other similar action. In another example, the instruction can be to put out a fire, apprehend a selected person, perform first-aid, or some other suitable action. The message can also include video received from one or more mobile devices for information or feedback in performing actions to manage the event.

Figure 10:
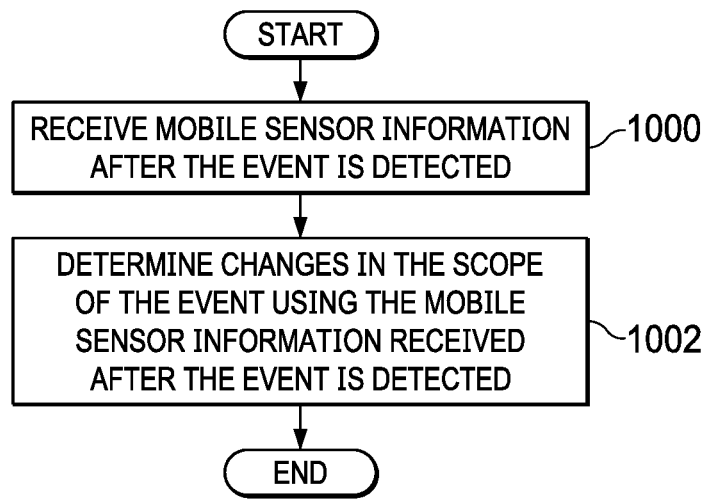
FIG. 10 is an illustration of a flowchart of a process for monitoring the scope of an event in accordance with an illustrative embodiment.

Turning next to FIG. 10, an illustration of a flowchart of a process for monitoring the scope of an event is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process in FIG. 10 can be implemented in event controller 206 in computer system 208 in FIG. 2. In this illustrative example, one or more of the operations in the process can be implemented using artificial intelligence system 230 that is accessed by or integrated in event controller 206.

The process receives mobile sensor information after the event is detected (operation 1000). The process determines changes in the scope of the event using the mobile sensor information received after the event is detected (operation 1002). The process terminates thereafter.

In operation 1002, determining changes in the scope of the event using the mobile sensor information received after the event is detected in which mobile sensor information indicates at least one of a movement, a dispersal, a growth, a direction of movement, or a speed of movement of a crowd of people.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in the flowchart in FIG. 5, the process can also receive system sensor information from sensor devices in network nodes in addition to receiving the personal sensor data from the human nodes in operation 500. In other words, the process can also use sensor data from network nodes in addition to crowd sourced data received in mobile sensor information.

As another example, the process in FIG. 6 can generate and analyze other types of models in addition to or in place of the crowd model and the object model. For example, an audio model that provides a visualization of sounds can be used. This audio model can identify the origination of sounds and the direction of travel sounds as well as provide ability to analyze the sound data. For example, a human operator can hear the sound after the model. In another example, an artificial intelligence system can analyze the sound in addition to information about the origination and direction of travel of the sound.

Figure 11:
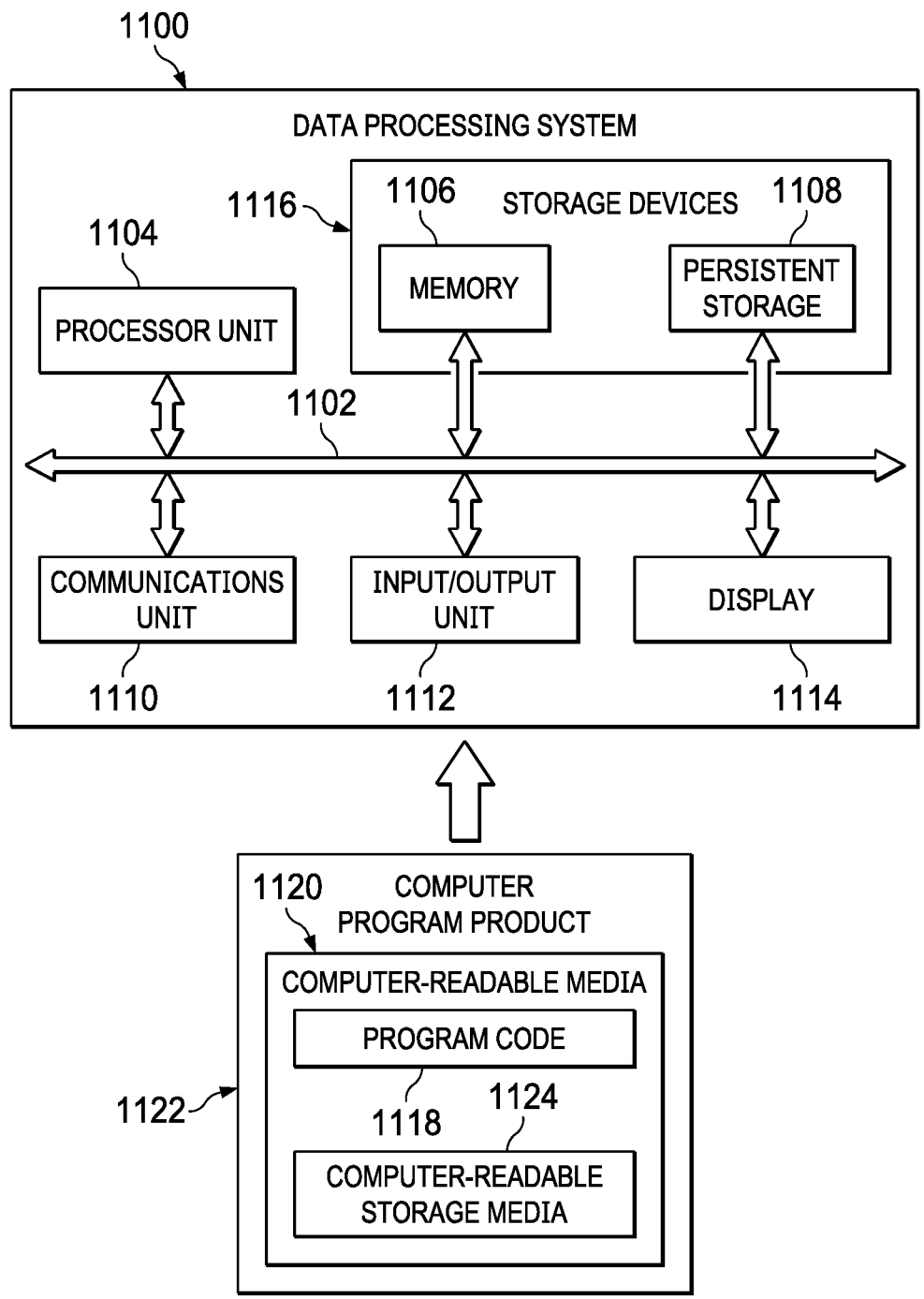
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement server computer 104, server computer 106, client devices 110, in FIG. 1. Data processing system 1100 can also be used to implement computer system 208 in FIG. 2, mobile devices 212 in FIG. 2, network nodes 226 in FIG. 2, and mobile device 402 in FIG. 4. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 can take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 can provide a connection for user input through at least one of a keyboard, a mouse, or some other suitable input device. Further, input/output unit 1112 can send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which can be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1100 are not meant to provide architectural limitations to the manner in which different embodiments can be implemented. In some illustrative examples, one or more of the components may be incorporated in or otherwise form a portion of, another component. For example, memory 1106, or portions thereof, can be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Figure 12:
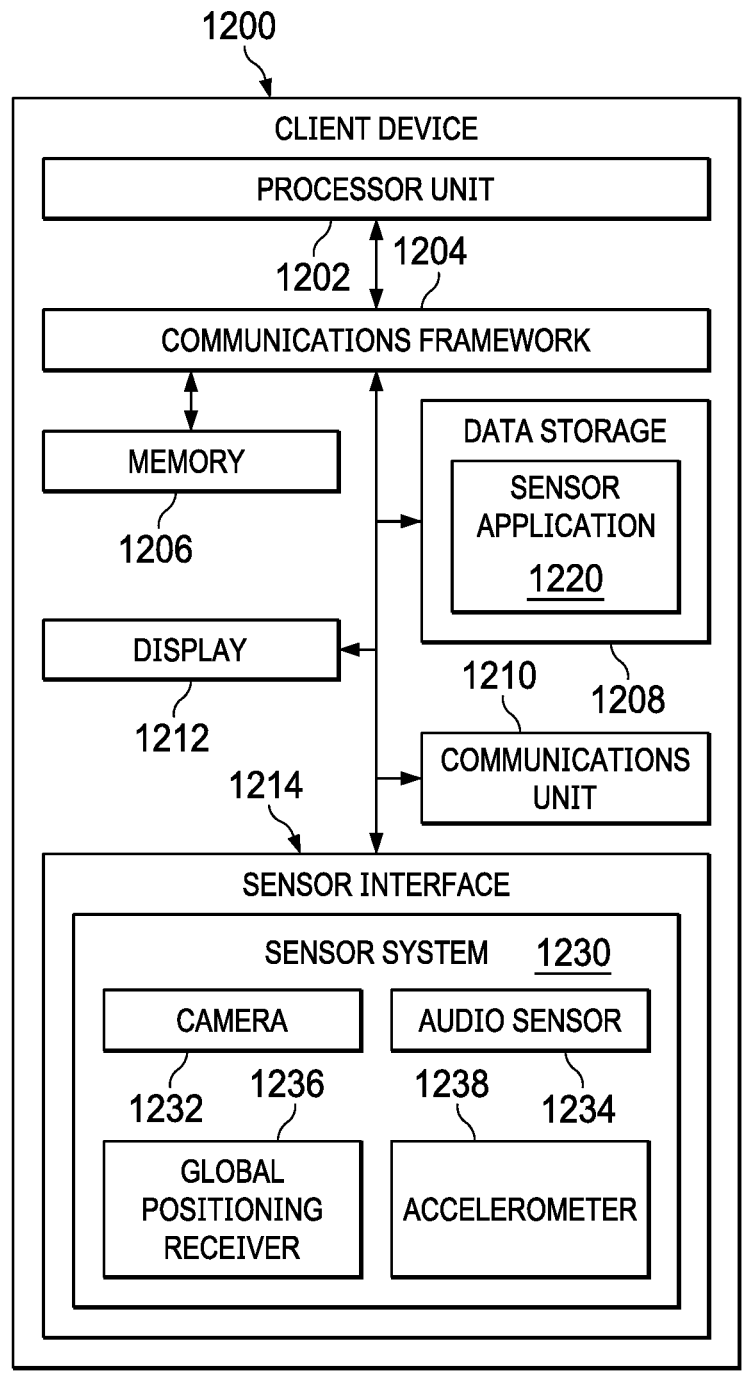
FIG. 12 is an illustration of a block diagram of a client device in accordance with an illustrative embodiment.

With reference to FIG. 12, an illustration of a block diagram of a client device is depicted in accordance with an illustrative embodiment. Client device 1200 is an example of one manner in which client devices 110 in FIG. 1, mobile devices 212 in FIG. 2, and mobile device 402 in FIG. 4 can be implemented. In this illustrative example, client device 1200 includes physical hardware components such as processor unit 1202, communications framework 1204, memory 1206, data storage 1208, communications unit 1210, display 1212, and sensor interface 1214.

Communications framework 1204 allows different components in client device 1200 to communicate with each other when connected to communications framework 1204. Communications framework 1204 is a bus system in this illustrative example.

Processor unit 1202 processes program code for software loaded into memory 1206. Processor unit 1202 include one or more processors. For example, processor unit 1202 can be selected from at least one of a multicore processor, a central processing unit (CPU), a graphics processing unit (GPU), a physics processing unit (PPU), a digital signal processor (DSP), a network processor, or some other suitable type of processor.

Memory 1206 is connected to processor unit 1202 through communications framework 1204. As depicted, memory 1206 can include at least one of a random access memory (RAM), a read-only memory (ROM), a static random access memory (SRAM), a dynamic random access memory (DRAM), or other suitable types of memory devices or circuits.

As depicted, data storage 1208 is connected to communications framework 1204 and can store data, program code, or other information. Instructions in program code can be loaded from data storage 1208 into memory 1206 for processing by processor unit 1202. Data storage 1208 can comprise at least one of a hard disk drive, a flash drive, a solid-state disk drive, an optical drive, or some other suitable type of data storage device or system.

For example, sensor application 1220 is an example of a mobile data application in sensor applications 302 in FIG. 3 and sensor application 400 in FIG. 4 and can be stored in data storage 1208. Sensor application 420 can be loaded into memory 1206 for execution by processor unit 1202 to generate mobile sensor information that can be used by an event controller, such as event controller 150 in FIG. 1 or event controller 206 in FIG. 2.

In this illustrative example, communications unit 1210 provides for communications with other data processing systems or devices. In these illustrative examples, communications unit 1210 includes at least one of a network interface card, a wireless communications device, a universal serial bus port, or other suitable device.

Display 1212 is connected to communications framework 1204 and provides a mechanism to display information to a user. In this example, display 1212 can be a touch screen display, which enables receiving user input through this display.

In this illustrative example, sensor interface 1214 is connected to communications framework 1204. As depicted, sensor interface 1214 can include hardware, software, or both that control the operation of sensor system 1216 in sensor interface 1214. Sensor system 1230 is hardware that is capable of generating mobile sensor information for output. Sensor system 1230 includes camera 1232, audio sensor 1234, global positioning system receiver 1236, and accelerometer 1238.

The illustration of client device 1200 is an example of one manner in which client device 1200 can be implemented. This illustration is not meant to limit the manner in which client device 1200 can be embodied in other illustrative examples. For example, sensor system 1230 can include other sensor devices in addition to or in place of the ones depicted in this figure. For example, sensor system 1230 can also include at least one of a temperature sensor, a gyroscope, a magnetometer, a proximity sensor, and an invite sensor, or other suitable types of sensors.

Thus, the illustrative embodiments provide a method, apparatus, and system for managing events. For example, a computer system receives mobile sensor information from mobile devices operated by human nodes in a location. The computer system determines whether an event has occurred at the location in which event management is needed for the event using the mobile sensor information. The computer system identifies resources needed for the event using the mobile sensor information in response to a determination that the event has occurred and allocates the resources identified to handle the event using the mobile sensor information.

As a result, the computer system operates as a special purpose computer system in which in the computer system enables detecting an event in which event management is needed as compared to current techniques. For example, the illustrative examples leverage human nodes carrying mobile devices with sensors. The mobile devices can be in communication with a network or form an ad hoc intelligence network.

The video and images from the mobile devices carried by human nodes can be analyzed and stitched together to form a more complete picture of the location in determining whether an event has occurred. As another example, with mobile sensor data from accelerometers on in mobile phones, at least one of crowd movement, dispersal, condensation, growth, and direction can be determined in real-time.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An event management system comprising:
   an event controller in a computer system, wherein the event controller:
   receives mobile sensor information from mobile devices operated by human nodes in a location;
   determines whether an event has occurred at the location in which event management is needed for the event using the mobile sensor information;
   identifies resources needed for the event using the mobile sensor information in response to a determination that the event management is needed for the event; and
   allocates the resources identified to handle the event.

2. The event management system of claim 1, wherein the event controller receives system sensor information from network nodes having sensor devices.

3. The event management system of claim 2, wherein the event controller directs the network nodes to generate the system sensor information from a set of positions relative to the location of the event based on the mobile sensor information.

4. The event management system of claim 3, wherein the network nodes comprise at least one of a camera, an unmanned aerial vehicle, an unmanned ground vehicle, an emergency phone station, a traffic light, or a body camera.

5. The event management system of claim 1, wherein the event controller uses an artificial intelligence system to analyze the mobile sensor information to determine whether the event has occurred at the location in which the event management is needed for the event.

6. The event management system of claim 1, wherein the event controller determines a trend in a crowd behavior including determining a set of outliers in the crowd behavior.

7. The event management system of claim 1, wherein the event controller uses an artificial intelligence system to allocate the resources to handle the event.

8. The event management system of claim 1, wherein in allocating the resources to handle the event, the event controller sends a set of first responders to the location of the event.

9. The event management system of claim 1, wherein in allocating the resources to handle the event, the event controller requests assistance from a set of the human nodes having a set of skills needed to handle the event.

10. The event management system of claim 1, wherein in allocating the resources to handle the event, the event controller requests a set of the human nodes to direct sensors devices in a set of mobile devices carried by the set of the human nodes a selected direction.

11. The event management system of claim 1, wherein the event controller continues to receive the mobile sensor information after the event is detected and determines changes in a scope of the event using the mobile sensor information received after the event is detected.

12. The event management system of claim 11, wherein in determining the changes in the scope of the event using the mobile sensor information received after the event is detected, the event controller determines the changes in the scope of the event using the mobile sensor information received after the event is detected using mobile sensor information that indicates at least one of a movement, a dispersal, a growth, a direction of movement, or a speed of movement of a crowd of people.

13. The event management system of claim 1 further comprising:
   sensor applications running on the mobile devices, wherein the sensor applications identify the mobile sensor information in the mobile devices and send the mobile sensor information to the event controller over wireless connections to the computer system in which the event controller is located.

14. The event management system of claim 1, wherein the mobile sensor information comprises at least one of an image, a video, an audio, a position, a speed, a velocity, an acceleration, a temperature, a heart rate, an email message, a text message, a social network posting, or an alert.

15. The event management system of claim 1, wherein the mobile devices comprise at least one of a mobile phone, a tablet computer, smart glasses, a smartwatch, a wearable device, a handheld computer, a laptop computer, a personal digital assistant, or a digital camera.

16. The event management system of claim 1, wherein the location is one of a park, a field, a city park, a theme park, a concert hall, a convention center, a recreational complex, a stage, a road intersection, a parking lot, a room, a lake, and a pool.

17. The event management system of claim 1, wherein the event is one of a sports event, an indoor event, an outdoor event, a concert, a play, a carnival, an accident, a fire, and a crime scene.

18. The event management system of claim 1, wherein the event controller generates a crowd model using the mobile sensor information, wherein the crowd model includes information about the location,
   wherein:
   the event controller determines whether the event has occurred at the location in which event management is needed for the event using the mobile sensor information and using the crowd model, and
   the event controller identifies resources needed for the event using the mobile sensor information and using the crowd model.

19. A method for managing an event, the method comprising:
   receiving, by a computer system, mobile sensor information from mobile devices operated by human nodes in a location;
   determining, by the computer system, whether the event has occurred at the location in which event management is needed for the event using the mobile sensor information;
   identifying resources needed for the event using the mobile sensor information in response to a determination that the event has occurred; and
   allocating, by the computer system, the resources identified to handle the event using the mobile sensor information.

20. The method of claim 19 further comprising:
   receiving, by the computer system, system sensor information from network nodes having sensor devices.

21. The method of claim 20 further comprising: directing the network nodes to generate the system sensor information from a set of positions relative to the location of the event based on the mobile sensor information.

22. The method of claim 21, wherein the network nodes comprise at least one of a camera, an unmanned aerial vehicle, an unmanned ground vehicle, an emergency phone station, a traffic light, or a body camera.

23. The method of claim 19, wherein determining, by the computer system, whether the event has occurred at the location in which the event management is needed for the event using the mobile sensor information comprises:

determining, by the computer system, whether the event has occurred at the location in which the event management is needed for the event using the mobile sensor information and an artificial intelligence system.

24. The method of claim 19, wherein determining whether the event has occurred at the location in which the event management is needed for the event using the mobile sensor information comprises:
   determining a trend in a crowd behavior including determining a set of outliers in the crowd behavior.

25. The method of claim 19, wherein allocating, by the computer system, the resources to handle the event using the mobile sensor information comprises:
   allocating the resources using an artificial intelligence system.

26. The method of claim 19, wherein allocating, by the computer system, the resources to handle the event using the mobile sensor information comprises:
   sending a set of first responders to the location of the event.

27. The method of claim 19, wherein allocating, by the computer system, the resources to handle the event using the mobile sensor information comprises:
   requesting assistance from a set of the human nodes having a set of skills needed to handle the event.

28. The method of claim 19, wherein allocating, by the computer system, the to handle the event using the mobile sensor information comprises:
   requesting a set of the human nodes to direct sensors in a set of mobile devices carried by the set of the human nodes a selected direction.

29. The method of claim 19 further comprising:
   receiving the mobile sensor information after the event is detected; and
   determining changes in a scope of the event using the mobile sensor information received after the event is detected.

30. The method of claim 29, wherein determining changes in the scope of the event using the mobile sensor information received after the event is detected comprises:
   determining the changes in the scope of the event using the mobile sensor information received after the event is detected in which the mobile sensor information indicates at least one of a movement, a dispersal, a growth, a direction of movement, or a speed of movement of a crowd of people.

31. The method of claim 19 further comprising:
   providing a set of incentives for allowing the mobile sensor information to be collected from the mobile devices.

32. The method of claim 19, wherein the mobile sensor information comprises at least one of an image, a video, an audio, a position, a speed, a velocity, an acceleration, a temperature, a heart rate, an email message, a text message, or an alert.

33. The method of claim 19, wherein the mobile devices comprise at least one of a mobile phone, a tablet computer, smart glasses, a smartwatch, a wearable device, a handheld computer, a laptop computer, a personal digital assistant, or a digital camera.

34. The method of claim 19, wherein the location is one of a park, a field, a city park, a theme park, a concert hall, a convention center, a recreational complex, a stage, a road intersection, a parking lot, a room, a lake, and a pool.

35. The method of claim 19, wherein the event is one of a sports event, an indoor event, an outdoor event, a concert, a play, a carnival, an accident, a fire, and a crime.

36. The method of claim 19, further comprising:
   generating a crowd model using the mobile sensor information, wherein the crowd model includes information about the location,
   wherein:
   the step of determining comprises determining, by the computer system, whether the event has occurred at the location in which event management is needed for the event using the mobile sensor information and using the crowd model,
   the step of identifying comprises identifying resources needed for the event using the mobile sensor information and using the crowd model in response to the determination that the event has occurred, and
   the step of allocating comprises allocating, by the computer system, the resources identified to handle the event using the mobile sensor information and the crowd model.

* * * * *